United States Patent

[11] 3,627,796

| [72] | Inventor | Ezra Levin<br>Champaign, Ill. |
|---|---|---|
| [21] | Appl. No. | 814,634 |
| [22] | Filed | Apr. 9, 1969 |
| [45] | Patented | Dec. 14, 1971 |
| [73] | Assignee | Viobin Corporation<br>Champaign, Ill.<br>Original application Nov. 2, 1964, Ser. No. 408,231, now Patent No. 3,538,973, dated Nov. 10, 1970. Divided and this application Apr. 9, 1969, Ser. No. 814,634 |

[54] CONTINUOUS PROCESS FOR PRODUCING FAT AND SOLIDS FROM WET BIOLOGICAL SUBSTANCE
9 Claims, 7 Drawing Figs.

[52] U.S. Cl.......... 260/412.8, 159/42
[51] Int. Cl.......... C11b 1/10
[50] Field of Search.......... 260/412.8

[56] References Cited
UNITED STATES PATENTS

| 2,752,377 | 6/1956 | McDonald | 260/412.8 |
| 2,788,275 | 4/1957 | Stöbe | 260/412.8 |
| 3,064,018 | 11/1962 | Bruera | 260/412.8 |
| 3,170,767 | 2/1965 | Wistreich | 260/412.8 |

Primary Examiner—Lewis Gotts
Assistant Examiner—Johnnie R. Brown
Attorney—Burmeister, Palmatier & Hamby ABSTRACT: A continuous process for producing fat and defatted solids from biological substance having a high-moisture content. Particles of substance and a solvent capable of forming an azeotrope with water and removing fat from the substance are continuously introduced into a wet intake zone and heated together to distill off azeotrope. Fluent mixture with entrained particles is continuously bled from the wet intake zone to a dry outlet zone and further heated to further dry the entrained particles in isolation from the intake zone. Miscella with entrained particles is continuously bled from the outlet zone for filtering of the dried particles from the miscella and separation of the fat from the miscella. Course particles are preferably screened from the fluent mixture bled from the intake zone to the outlet zone. Large portions of the particles subjected to drying and defatting are removed to advantage from the intake zone and outlet zone respectively for further processing.

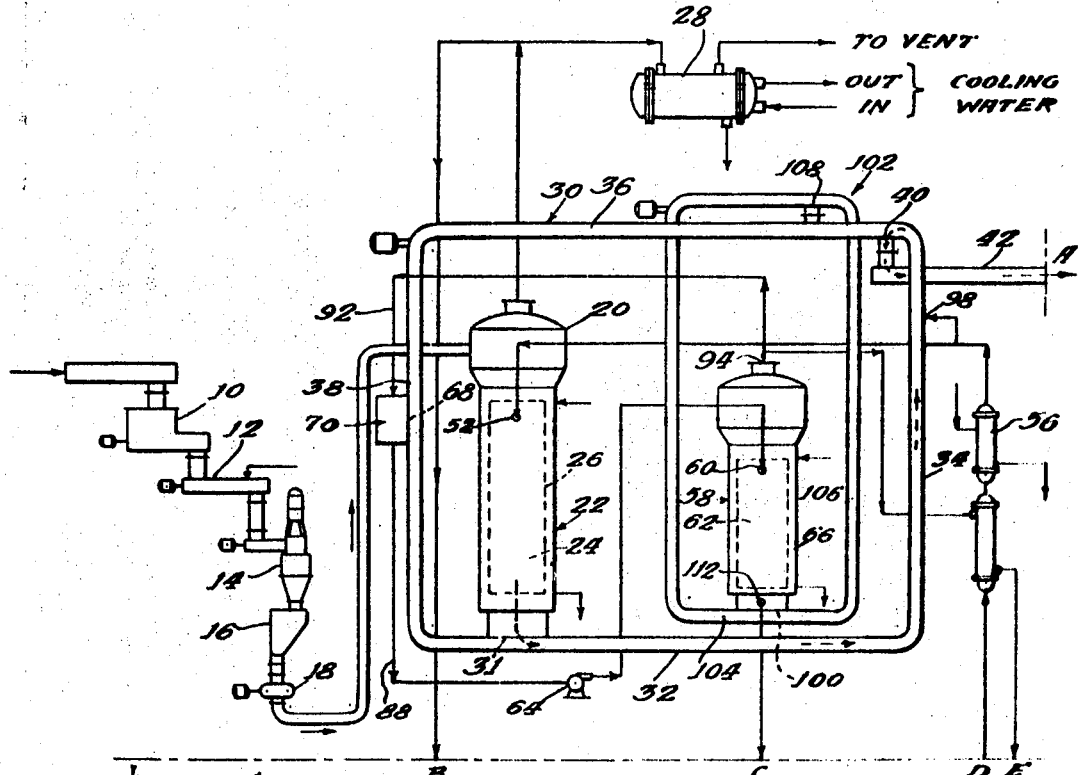
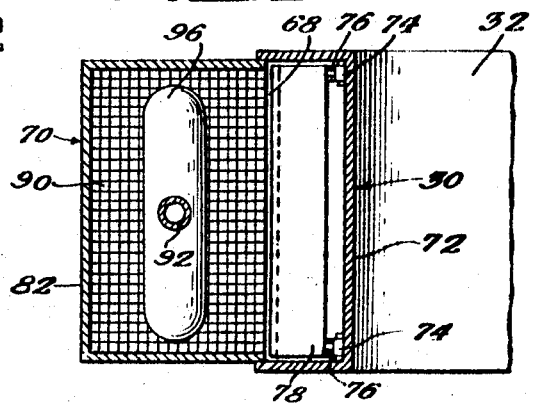
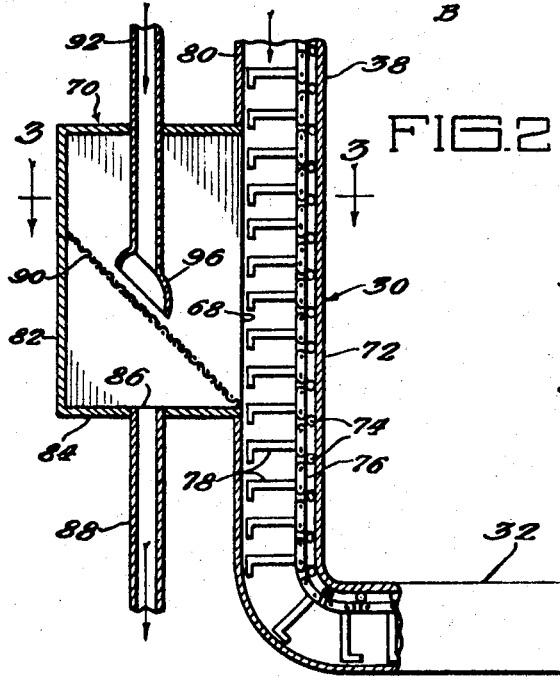

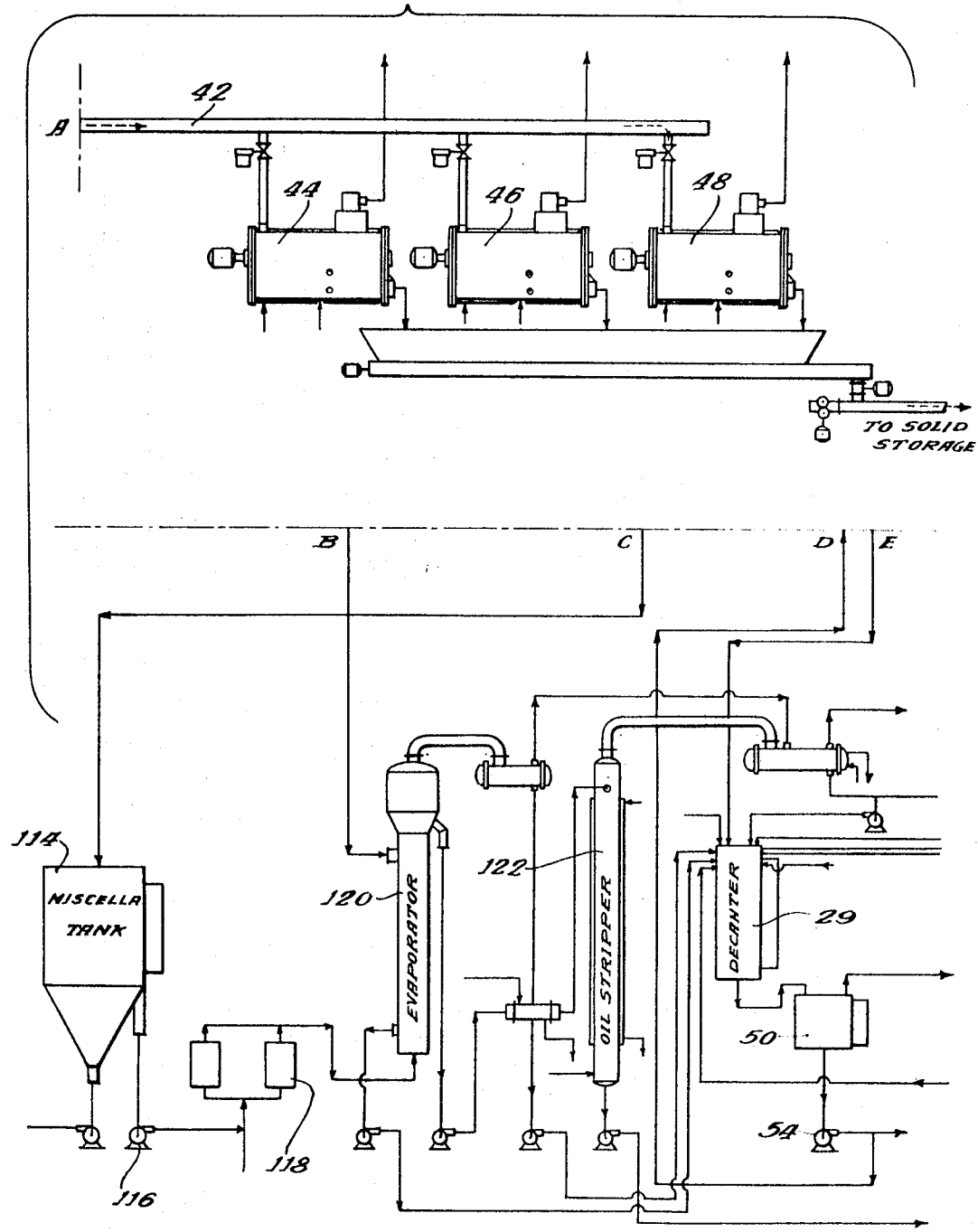

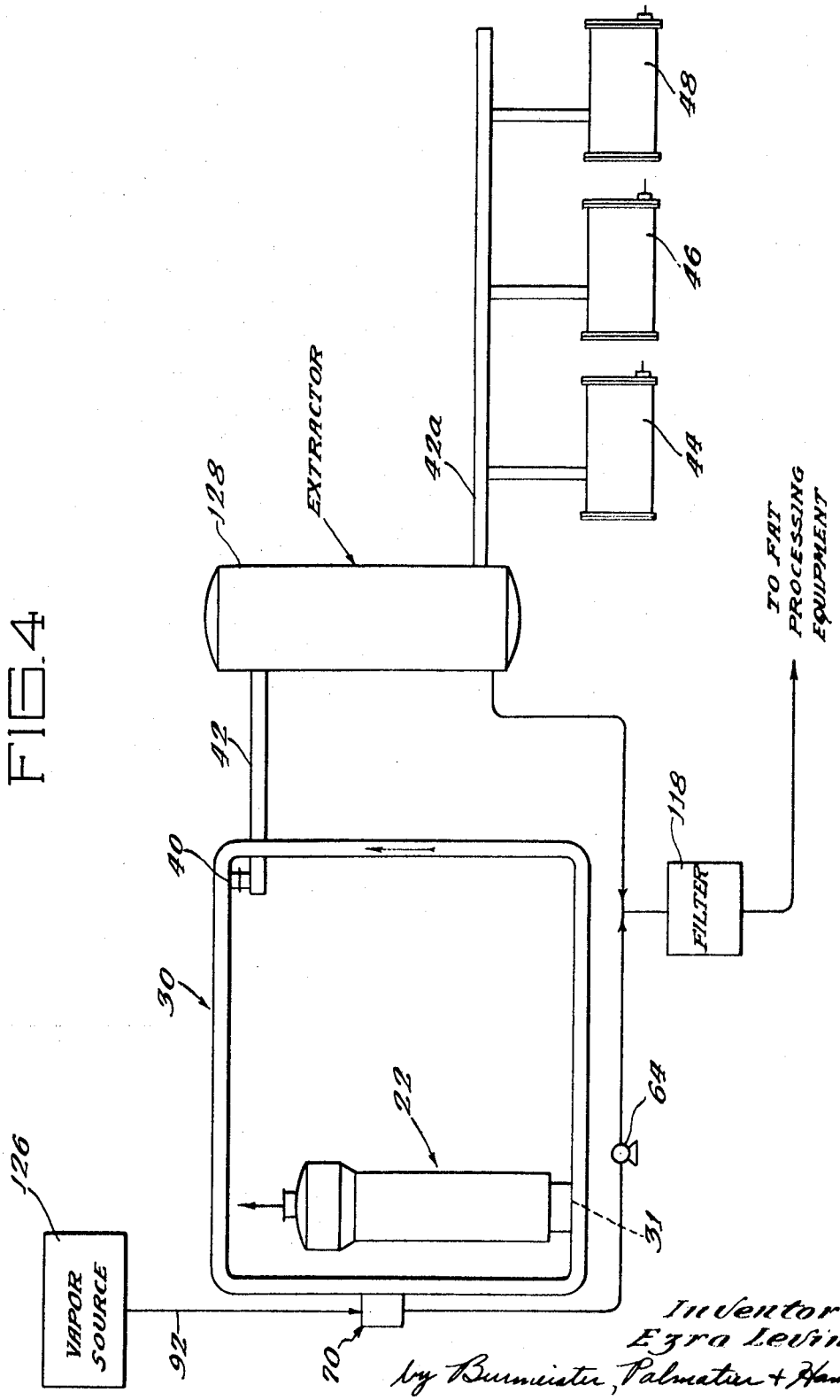

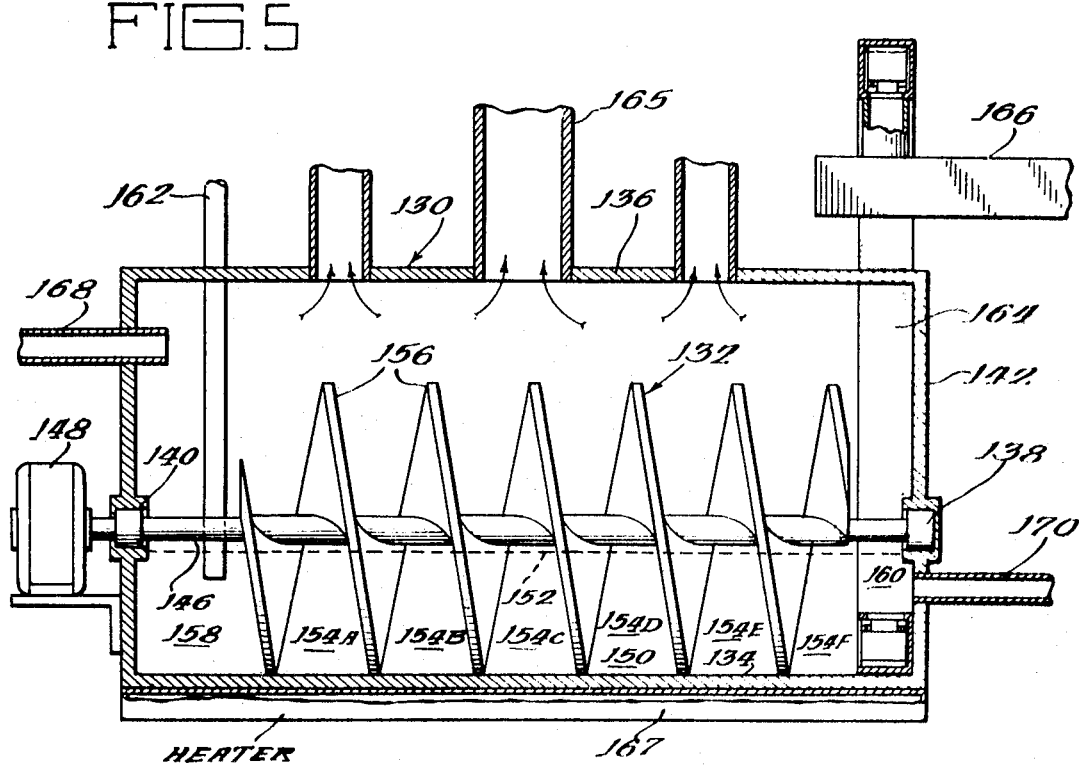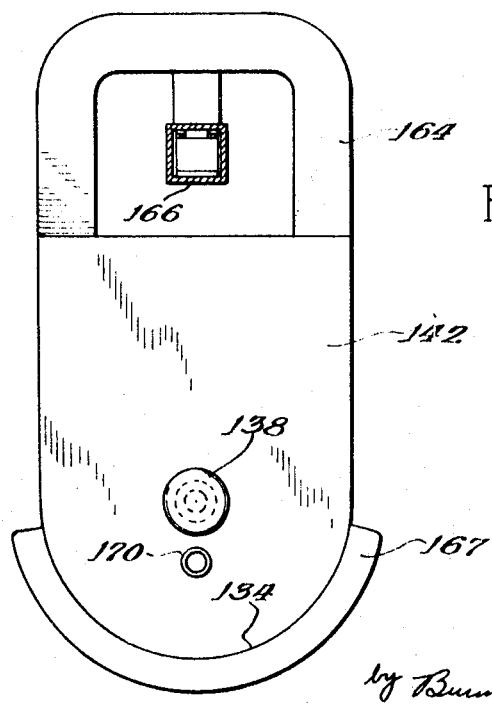

CONTINUOUS PROCESS FOR PRODUCING FAT AND SOLIDS FROM WET BIOLOGICAL SUBSTANCE

This is a division of applicant's copending application, Ser. No. 408,231 filed Nov. 2, 1964, now U.S. Pat. No. 3,538,973.

The present invention related generally to processes for separating fat from tissue, and particularly to continuous processes for separating fat from wet tissue and to apparatus utilizing such continuous processes.

Many substances, particularly of animal origin, contain relatively high proportions of water which are present either in the form of intercellular fluid or are present in the cell tissue and intercellular fluid. The presence of a moisture content in tissue in excess of 20 percent greatly impairs or prevents use of a solvent extraction process for removal of fat from the tissues. It is highly desirable to extract fat from many substances which contain large amounts of eater, such as fish, meats, blood, coconut and the like.

The present inventor's U.S. Pat. No. 2,619,425, entitled "DRYING AND DEFATTING TISSUE" describes a process for simultaneously removing moisture and fat from ground tissue by means of azeotropic distillation. Two liquids form an azeotrope when tee conditions of the following formula are met:

$$P_1 + P_2 = P_t \text{ and } \frac{W_2}{W_1} = \frac{P_2}{P_1} \times \frac{M_2}{M_1}$$

Where
$P_1$ = vapor pressure of first liquid,
$P_2$ = vapor pressure of second liquid,
$P_t$ = total vapor pressure of combined liquids, equal to pressure of system for boiling of the mixture
$W$ = vapor weights, and
$M$ = molecular weights.

An azeotrope has the property of boiling at a lower temperature than the boiling point of either of the liquids which form the azeotrope. In accordance with the process described in U.S. Pat. No. 2,619,425, the tissue is first processed to assume the form of comminuted particles, and these particles are introduced into a body of boiling water-immiscible fat solvent which forms an azeotrope with water, thus forming a slurry. The moisture of the particles leaves the particles to form the azeotrope with the solvent, and the particles are dried by distillation of the azeotrope of water and solvent. As long as moisture remains in the vessel, the vessel boils at the temperature of the azeotrope. The partially or completely dehydrated particles fall through the slurry to the bottom of the vessel, and the particles are removed from the bottom of the vessel. If the azeotropic distillation process is permitted to continue until completion, the boiling point of the slurry will rise to the temperature of the solvent, and all the particles will be reduced to a low moisture and fat content.

The process covered by U.S. Pat. No. 2,619,425 has great utility in that it achieves dehydration and defatting of tissue at relatively low temperatures in an economical process. This process is particularly suited for dehydration and defatting of wet tissues, sine particles of high moisture content, as well as low moisture content, may be introduced into the boiling body of solvent. Further, the dehydrated particles are readily separated and recovered from the solution of solvent and fat, called the miscella, present in the slurry, since the miscella of the slurry may simply be drained from the particles, and occluded fat washed from the particles by fresh solvent. Since all particles are dry, the miscella may then be filtered to remove fine particles therefrom. However, this process has not been suitable for large scale separation of fat from wet tissue since it has not been possible to separate large quantities of particles from the solvent and fat in a continuous and economical process.

It is desirable to continuously feed comminuted tissue particles into a vessel containing a boiling body of azeotrope forming solvent, and to remove the solid particles from the vessel, such as by a conveyor, while continuously distilling the azeotrope, and thereafter simply filter the miscella thus produced to remove fine particles. This, however, cannot be accomplished with wet-fat tissues because the water containing tissue substances, such as callogen or cellulose, in he wet state, are not easily filtered. They clog the filters and prevent removal of the miscella containing wet fat which is essential to the process. This problem does not occur when employing the inventor's batch process of the foregoing patent because substantially complete drying of the particles in the vessel has been achieved before the miscella is removed from the vessel. In the batch process, the rise in temperature of the boiling contents of the vessel to approximately the boiling point of the solvent is used to indicate the fact that the solid particles have become substantially dry. The particles must be substantially dry before they will filter. The miscella may then be removed and filtered, since the dry fine particles present in the miscella are not sticky and will not clog a filter. In a process in which wet particles are continuously introduced in quantity into the boiling solvent, the particles are always moist and sticky, because the temperature of the boiling mass is always at or near the boiling point of the azeotrope, a condition which indicates that the particles are wet. It is an object of the present invention to provide a method and apparatus for continuously removing the fat and evaporating moisture from wet tissue by azeotropic distillation in which the miscella can be substantially separated from wet particles in a continuous operation, and the miscella can be continuously drawn from the vessel, filtered and processed.

U.S. Pat. No. 2,619,425 also discloses continuous processes for dehydrating and defatting tissue with substantial moisture content in which comminuted particles of the tissue are subject to an azeotropic distillation process carried out in a vertical tower, perhaps provided with a particle collecting leg near the base of the tower. Solvent rich in fat is withdrawn from the vessel above the solid collecting leg. Because the slurry in the vessel is maintained at he boiling pint of he azeotrope, the withdrawn solvent and fat solution also contains wet particles which prevent filtration. Separation of fat from the miscella, and subsequent filtration has only been accomplished prior to the present invention by a batch process. After the total wet product has been introduced into the boiling solvent and introduction of raw wet tissue has ceased, total moisture may be removed by distillation of the azeotrope so that the solvent may rise to its boiling point. It is therefore an object of the present invention to extract the fat from moist tissue continuously and filter continuously.

One of the objects of the present invention is to provide an economical continuous system for defatting and dehydrating biological tissue, particularly animal offal. In the case of animal offal, the economical separation of fat from solvent is facilitated by concentrating the ratio of fat to solvent. It is, therefore, a further object of this present invention to provide a process and apparatus for continuously processing biological tissue by azeotropic distillation in which the miscella produced in the distillation stage has a higher concentration of fat to solvent than achieved previously.

In certain tissue, such as coconut, the ratio of fat to pulp is higher, and it is not desirable to concentrate this ratio during the extraction process. The moisture content of coconut is too great for conventional solvent extraction processes. Hence, it is a further object of the present invention to provide a method and apparatus for extracting fat from tissue having a high moisture content and a high fat content relative to solids.

The foregoing object os the invention are achieved by continuously feeding raw tissue particles into the system and by dividing the extraction process of the system into two separate stages and removing solid particles from one or both of the stages. In the first stage, distillation of an azeotrope of solvent and water from the tissue is utilized to reduce the moisture content of the tissue below 20 percent and to partially extract fat from the tissue. In one embodiment of the invention, two separate distillation vessels are employed, and raw comminuted tissue is continuously fed into the first vessel. The first vessel is operated to partially dry and defat the particles of biological tissue fed into the system by distillation of an azeotrope of water and solvent, and a portion of these particles are removed from the first distillation vessel in a continuous stream. The miscella of the first vessel and a relatively small portion of partially dried particles are continuously fed into the second vessel which is operated to complete drying and defatting of the particles to a suitable moisture and fat content by distillation of the azeotrope of solvent and water boiling at approximately the boiling point of the solvent, and the dried and defatted solid particles are continuously removed from the second vessel. A miscella concentrated in fat is continuously withdrawn from the second vessel, and this miscella contains only a small quantity of fine dry particles of tissue. These fine dry tissue particles are then removed from the miscella by filtering leaving a solution of concentrated fat and solvent. The remaining solvent is then removed from the miscella by continuous steam distillation, leaving substantially solvent free fat.

It is critical that substantially all solids which leave the second vessel are dried and defeated to a degree to permit filtering without clogging of the filters. These particles if wet are sticky and gummy and will clog a filter. It is the purpose of the second distillation vessel to carry on the drying process to substantial completion to convert the wet gummy particles to solid dry particles, and thus avoid having moist particles passing into the filter. This can be accomplished only if the moist particles entering the second vessel are relatively few in quantity and the moisture content of the particles is substantially below that of the raw tissue. The latter requirement is met in the present process because all particles entering the second distillation vessel have been subjected to substantial dehydration in the first distillation vessel, although the particles entering the second vessel still retain substantial moisture since the first vessel boils at the azeotropic boiling point and not the boiling point of the solvent, and these particles are gummy and sticky and capable of clogging the filter. The quantity of solid particles entering the second vessel is reduced by removal of solid particles from the first distillation vessel, thereby reducing the concentration of solid particles in the first vessel, an by transferring less of the solid wet gummy particles to the second vessel through the use of a specially designed screen which is kept from clogging by a unique method using vapor to prevent clogging.

In another embodiment of the present invention, the first and second stages of the process are carried out to in a single vessel, and a means for isolating the slurry into noncirculating compartments is provided. Wet raw tissue particles are introduced into a body of solvent forming an azeotrope with water in a receiving compartment, and the dried particles and miscella are removed from a discharge compartment. The slurry of solvent, particles, fat and water is maintained boiling in all portions of the vessel, but the temperature is that of the boiling pint of the azeotrope in the receiving compartment while it is that of the boiling point of the solvent in the discharge compartment.

In still another embodiment of the invention, tissue particles of high fat and water content are continuously introduced into a vessel containing a body of solvent forming an azeotrope with water and boiling at the boiling point of the azeotrope. Distillation of the azeotrope is continuously carried on in the vessel to produce a miscella which may be directly filtered and processed. A large portion of the partially dried and defatted particles are removed from the vessel and subjected to a conventional solvent extraction process to complete defatting.

The invention its objects and advantages, will be more thoroughly understood from the following specification and drawings in which:

FIGS. 1 and 1A are a flow diagram for a plant for separating solids and fat from animal tissue;

FIG. 2 is a sectional view of a portion of the main conveyor diagrammatically illustrated in FIG. 1 for filtering the miscella at the outlet of the primary cooker;

FIG. 3 is a sectional view taken along the line 3—3 of FIG. 2;

FIG. 4 is a fragmentary view of a modified construction of the plant of FIGS. 1 through 3;

FIG. 5 is a vertical sectional view of another embodiment of a continuous solvent extractor constructed according to the teachings of the present invention; and FIG. 6 is an end elevational view of the extractor of the present invention as illustrated in FIG. 5.

As indicated in FIG. 1, biological tissue, such as animal offal, is transformed into a pumpable fluid by means of a prebreaker 10, feed screw 12, disintegrator 14, and hopper 16. The small particles of biological tissue are subjected to low-pressure steam which is introduced prior to the hopper 16, specifically into the feed screw 12. Also, the particles of biological tissue may be mixed with the solvent which is to be used in the process in the step of transforming the tissue into a pumpable fluid.

A feed pump 18 is then utilized to pump the pumpable particles into the upper portion or head 20 of a primary cocker 22 or first distillation vessel. The primary cooker 22 is a vertically disposed elongated vessel with the head 20 positioned at the top thereof. A body of substantially water-immiscible fat solvent is disposed within the primary cooker below the head thereof. The body of solvent, designated 24, must form an azeotrope with water preferably boiling substantially below 100° centigrade at atmospheric pressure. The solvent should be selected to form an azeotrope which will remove substantial portions of water in relation to the amount of solvent distilled at the operating temperature selected. Among solvent of this class, ethylene dichloride is a preferred solvent. Ethylene dichloride has a boiling point at atmospheric pressure of 83° C., and a water-ethylene dichloride azeotrope boils at 71.5° C. Another example of a particularly suitable solvent is heptane which boils at 98.4° C. at atmospheric pressure A water-heptane azeotrope boils at 79.5° C. under atmospheric conditions. Other suitable solvents include propylene dichloride, trichlorethylene, perchlorethylene, and other low-boiling chlorinated solvents. Suitable chlorinated solvents may include the bromine, iodine or fluorine derivatives of aliphatic hydrocarbons. In general, a suitable solvent must boil below 120° C. under standard conditions. The hydrocarbon fat solvents including benzene, hexane, toluene, cyclohexane, heptane, and others are suitable. The solvent must not be reactive with the tissue constituents under operating conditions and must be capable of being removed by evaporation from the fat without leaving harmful or toxic residues.

Valuable properties of the solid particles recovered from the process of the present invention will be lost if the tissue particles are subjected to elevated temperatures. For this reason, the solvent is preferably selected to boil at a sufficiently low temperature below about 93+ C. However, if the process is being operated solely for fat rendering, it is not necessary to maintain a low operating temperature. As indicated by the inventor's U.S. Pat. No. 2,619,425, however, a temperature of operation is selected dependent upon the character, use and properties desired of the final solid products. The temperature of the primary cooker may be reduced to permissible limits for the production of heat sensitive products by reducing the pressure within the primary cooker and thereby reducing the boiling point of the solvent.

The moist particles of biological tissue are continuously introduced into the boiling solvent within the primary cooker 22, either by precoagulation and treatment with a portion of the solvent, as described in U.S. Pat. No. 2,503,312 of the present inventor and Everett M. Worsham, or by spraying the particles into the solvent adjacent to the upper level thereof, or some other suitable means which will avoid formation of an agglomeration of the particles. In certain instances, it is advantageous to pump an emulsion or mixture of the particles with the solvent used in the cooker 22 into the primary cooker so that the biological substances will form droplets. However, animal offal produced from slaughtering may be more easily ground and improved for pumping if treated with low-pressure steam to convert part of the collagen to gelatin, as more fully described in the inventor's U.S. Pat. No. 2,996,386 and as indicated in FIG. 1. The particles are dehydrated and defatted in the primary cooker 22, at least to the extent that they cannot coalesce into lumps or stick to the vessel, but the particles all remain wet due to the fact that raw tissue particles are continuously introduced, thus maintaining a water-solvent azeotrope within the vessel. The particles of biological substances within the first vessel 22 to become heavier than the solvent due to partial drying, however, and tend to settle toward the bottom of the primary cooker 22 in spite of the solvent boiling of the solvent.

As indicated in FIG. 1, the primary cooker 22 is provided with an internal heater 26 which utilizes low-pressure steam as a heat source in order to maintain the body 24 of solvent under rapid boiling conditions. Vapor from the body 24 of solvent rises through the head 20 of the primary cooker and is conducted to a condenser 28 which is provided with a flow of cool water. Both the solvent and the water vapor are condensed to liquid form, and the solvent, and water vapor are separated by a decanter 29, as is well known in the art. The water vapor is discarded and the recovered solvent returned to the system.

The bottom of the primary cooker 22 is in communication with a runaround main conveyor 30. Granules formed from the biological tissue settle through the boiling body 24 of solvent, pass through an opening 31 at the bottom of the primary cooker 22 and enter the bottom leg 32 of the conveyor 30. The conveyor 30 has four legs, 32, 34, 36 and 38 forming a continuous rectangular path in a vertical plane, and a belt-type conveyor is continuously translated within the four legs to elevate the granules passing through the opening 31 at the bottom of the primary cooker 22. The top leg 36 has an opening 40 which communicates with a horizontal conveyor 42 to transporting particles to one of a plurality of desolventizers 44, 46 or 48. The desolventizers are used in sequence and operate on the batch system.

A relatively large quantity of solvent is maintained in storage in a work tank 50, and this solvent is continuously introduced into a port 52 located near the upper level of the boiling body 24 of solvent in the primary cooker 22. A pump 54, and solvent heater 56 are connected in the path between the solvent work tank 50 and the port 52 to provide an adequate supply of heated solvent to the primary cooker 22 to maintain the level of the body 24 of solvent within the primary cooker.

Operation of the primary cooker results in the body 24 becoming a slurry of solvent, granules of wet-fat partially dried tissue, and fat which has been extracted from the tissue. Since raw tissue is continuously being introduced into the primary cooker 22, and the body 24 is violently boiling, the tissue is not permitted to dry. The relatively wet tissue is present throughout the body 24 of slurry because the azeotropic temperature is maintained while wet tissue is being added continuously. Under these conditions, the miscella is wet, and filtering the miscella would clog the filter. Thus, it is not possible to filter the miscella directly from the primary cooker 22.

In accordance with the present invention, a portion of the slurry which is formed in the primary cooker 22 is continuously introduced into a secondary cooker 58 through a port 60 located in the secondary cooker 58 near the top of a vigorously boiling body 62 of a slurry from the primary cooker 22 disposed in a secondary cooker 58. A pump 64 located between the primary cooker 22 and secondary cooker 58 maintains the body 62 at a relatively fixed level above the port 60. A heater 66 located within the secondary cooker 58 maintains the body 62 under boiling conditions.

The pump 64 is coupled into an opening 68 in the upper portion of the leg 38 of the conveyor 30. The conveyor travels in a counterclockwise direction, as indicated in FIG. 1, and is hence travelling downwardly in the leg 38. The FIGS. illustrate a filer 70 which is utilized to retain as many of the solid particles as possible in the primary cooker 22 and pass only a minimum number of solid particles in the miscella pumped by the pump 64 to the secondary cooker 58.

FIG. 2 is a sectional view of the filer 70 showing a portion of the leg 38 of the conveyor 30. The conveyor 30 is formed by a continuous tube having a generally rectangular cross section. The inner wall 72 of the tube carries a plurality of rollers 75 which translatably support a plurality of links 76 of a continuous chain. Each of the links 76 carries an L-shaped shoe 78 which catches solid particles passing through the opening 31 from the primary cooker and carries the solid particles through the leg 32 and the leg 34 of the conveyor 30 to deposit them in the outlet 40 in the leg 36 thereof.

As illustrated in FIG. 2, the conveyor 30 also has an outer wall 80, and the opening 68 which permits the slurry from the primary cooker 22 to flow to the pump 64 is disposed in this outer wall 80 of the leg 38 well below the level of the slurry in the primary cooker 22. A rectangular fluidtight box 82 is sealed about the perimeter of the opening 68, and the box has a bottom 84 with an aperture 86 sealed to a tube 88 which communicates with the inlet of the pump 64.

A screen 90 is sealed within the box 82 on a plane at an angle to the horizontal in order to filter large particles from the flow of miscella to the pump 64, and hence to the secondary cooker. The screen 90 has the function of limiting the flow of solid particles to the secondary cooker 58, and hence providing for removal of a large portion of the solid particles impressed upon the system through the conveyor 30 directly from the primary cooker 22. In practice, approximately 90 percent of the particles introduced into the primary cooker are removed by means of the primary conveyor 30, and the screen 90 contributes substantially to this result. If the screen were not present, experience has proved that 30 to 40 percent of the particles would be reworked by pumping of the particle laden miscella to the secondary cooker 58 for drying.

The wet miscella causes a glaze to develop and build on the screen 90, and unless some means is provided, the glaze will clog the screen, even if the perforations of the screen are very large. Even a wire mesh of sufficient size to perit the passage of 30 percent of the particles from the primary cooker to the secondary cooker will clog unless some means is provided to maintain the screen 90 sufficiently clean to pass the miscella.

The present inventor has found that a 20 mesh screen will permit flow of the miscella by utilizing dry solvent vapors, such as are evaporated from the secondary cooker 58, to keep the screen 90 clean. A tube 92 communicates with an outlet 94 in the head 20 of the secondary cooker 58 and conducts the hot solvent vapors from the primary cooker 22 to a nozzle 96 confronting the side of the screen opposite the bottom 84 of the box 82. The vapor pressure from the secondary cooker is maintained at about 5 pounds per square inch. The flow of solvent vapors onto the screen 90 has two separate functions. The flow of pressurized solvent vapor sweeps the screen clean and open and prevents clogging of any kind to permit the miscella, including the sticky finer particles, to flow through the screen. The flow of vapor also raises the temperature of any wet particles on the screen 90 to convert the gelatin adhering to the screen by drying into hard solid particles. The solid particles which fail to pass the screen 90 are swept back into the leg 38 of the conveyor 30, and the conveyor 30 drags the solid particles along the conveyor toward the discharge opening 40 thereof. In this manner, the screen 90 is maintained open for a free flow of miscella in accordance with the demands of the miscella pump 64.

The slurry in the primary cooke 22 boils at the boiling point of the azeotrope, whereas the slurry in the secondary cooker 58 boils at the boiling point of the solvent. With ethylene dichloride as the solvent, the primary cooker 22 boils at a temperature of approximately 71.5° C. at atmospheric pressure, and the secondary cooker boils at a temperature of approximately 83° C. at atmospheric pressure. It is thus clear that substantial moisture is present in the primary cooker 22 as a result of the relatively large quantity of wet particles being injected into the slurry of the primary cooker. Because of the relatively few particles from the primary cooker 22 which enter the secondary cooker 58 and since the particles that do enter the secondary cooker 58 have been partially dried from the raw state, less moisture is introduced into the secondary cooker 58 than is introduced into the primary cooker 22 in the same period of time. As a result, it is feasible and economically practical to supply sufficient heat to the secondary cooker 58 to drive the temperature of the slurry 62 therein to approximately the boiling point of the solvent. Since there is little water present in the secondary cooker 58, the particles removed therefrom contain very little moisture.

The solid particles passing through the opening 31 from the primary cooker 22 are only partially dried and partially defatted as a result of extraction by the solvent in the slurry of the primary cooker 22. In addition to the fat within the particles, the particles carry with them a quantity of occluded fat. The occluded fat is washed from the particles by a flow of clean solvent introduced into the leg 34 of the conveyor 30 in the upper portion thereof through a port 98. This flow of clean solvent also extracts fat from the particles, since the quantity of moisture in the particles has been reduced to a level permitting extraction by conventional processes. A portion of the solvent flowing from the solvent work tank 50 through the solvent pump 54 is used for this purpose. In this manner, the granular solid particles passing through the opening 40 to the horizontal conveyor 42 have a very low fat content. In addition, the countercurrent flow of solvent through the leg 34 and the leg 32 of the conveyor 30 adds to the solvent introduced through the port 52 of the primary cooker 22 to maintain the level of the solvent in the primary cooker and to replace the solvent evaporated by the azeotropic distillation process.

The secondary cooker 58 is also provided with an opening 100 at the bottom thereof, and a second runaround conveyor 102 passes beneath the secondary cooker 58. The second conveyor 102 has a horizontal leg 104 extending below the secondary cooker 58, a rising leg 106 which extends to an opening 108 for depositing dried granular meal into the upper leg 36 of the primary conveyor 30, and hence to the horizontal conveyor 42. The particles passing through the opening 100 are both dry and defatted, and it is not necessary to introduce a counterflow of fresh solvent in order to wash occluded fat from the particles.

As described above, all of the particles in the conveyor 42 are of low fat content, but those particles from the primary cooker 22 contain substantial moisture. This moisture is removed with the solvent in the desolventizers 44, 46 and 48 to produce a solid product which is granular and contains very little moisture or fat, and hence has great stability.

One of the advantages of the apparatus of FIGS. 1 through 3 is that it inherently produces a solid product of low-fat content and does so economically. The proportion of fat to solids in the primary cooker 22 is not much different than in the raw tissue because of the fact that these substances are continuously passing through the primary cooker. The solid particles removed from the primary cooker 22 directly to the conveyor 42 have never been soaked in a high-fat miscella. Since a very large proportion of the solid particles are removed from the primary cooker, perhaps 90 percent, only a small number of solid particles are soaked in the fat-rich miscella of the secondary cooker (in most cases 16 to 20 percent oil). As a result, a solid product low in fat is economically achieved.

The secondary cooker 58 is provided with an outlet port 112 near the bottom thereof, and a miscella is withdrawn through the outlet port 112. It is to be noted that the miscella is highly concentrated in fat, since no fresh solvent is introduced into the secondary cooker 58, and the secondary cooker 58 concentrates the miscella from the primary cooke 22. This miscella withdrawn from the secondary cooker 58 is collected in the miscella tank 114, pumped by a pump 116 through one of two filters 118 to a vacuum evaporator 120. The evaporator 120 evaporates the solvent from the miscella, the fat is thereafter conducted through an oil stripper 122 to a fat storage tank 125.

If a product contains a relatively small quantity of solid particles and a relatively large amount of fat, it may be desirable to transfer the miscella from the primary cooker 22 to a conventional type of solvent extractor, as illustrated in FIG. 4. In FIG. 4, the primary cooker 22, conveyor 30, filter 70, the desolventizers 44, 46 and 48, pump 64, and the miscella filters are identical to those elements set forth in FIGS. 1 through 3, and hence the same reference numerals have been used to designated these elements. Since the secondary cooker 58 is not utilized, a separate source 126 of dry solvent vapor pressure is conducted to the filter 70 through the pipe 92. A solvent extractor 128 of the continuous type, such as disclosed in U.S. Pat. No. 2,840,459, is inserted in the conveyor 42 between the opening 40 of the runaround conveyor 30 and the desolventizers 44, 46 and 48.

When the biological substance being defatted and dried has a moisture content in excess of 20 percent, conventional solvent extraction processes may not be utilized, since the presence of the moisture prevents extraction of the fat. Such products may be continuously introduced into the primary cooker 22 operating at the boiling point of the azeotrope formed by the solvent in the primary cooker and water, thus removing sufficient moisture from the particles introduced into the primary cooker 22 to reduce the moisture content of the particles to below 20 percent and thus permit conventional solvent extraction. A miscella is removed form the primary cooker 22 by means of the filter 70 and the miscella pump 64, and filtered through the filter 118 in a manner identical to that described for the construction of FIGS. 1 through 3. The particles passing through the opening 31 of the primary cooker 22 are conveyed by the runaround conveyor 30 to the extractor 128, and a miscella which is rich in fat is produced by the extractor 128 and flows to the filter 118. The defatted particles from the extractor are then conveyed by a portion of the conveyor 42A to the desolventizers 44, 46 and 48. The desolventizers operate on a batch process, as indicated for the embodiment of FIGS. 1 through 3, and remove the solvent carried by the particles and also complete drying of the particles.

FIGS. 5 and 6 illustrate another type of apparatus for carrying out the present invention. In these FIGS., a single elongated vessel 130 is provided with a rotatable screw conveyor 132 which extends along the axis of elongation of the vessel 130. The screw conveyor 132 extends at its lower side to slidably abut a curved bottom 134 of the vessel, but the vessel has a flat upper wall 136 spaced from the upper edge of the screw conveyor 132. The screw conveyor is rotatably mounted on bearings 138 and 140 disposed in end walls 142 and 144, respectively. A shaft 146 of the screw conveyor 132 extends through the bearing 140 to an electric motor 148 which rotates the screw conveyor 132.

The vessel 130 is partially filled with a body of solvent 150, the solvent extending no higher in the vessel than the axis of the shaft 146 of the screw conveyor 132, and the level being indicated at 152. In this manner, the screw conveyor 132 provides movable compartments designated 154A, 154B, 154C, 154D, 154E and 154F between the adjacent blades 156 of the screw conveyor 132. In addition, there is a compartment 158 at the inlet and a compartment 160 at the outlet.

The pumpable fluid which contains the raw tissue particles to be dehydrated and defatted enters the vessel 130 through a pipe 162 in a manner identical to that described in the embodiment of FIGS. 1 through 3. The pumpable fluid is ejected from the pipe 162 into the inlet compartment 158 beneath the surface 152 of the body 150 of the solvent in the vessel 130. A heater 164 which extends about the bottom 134 of the vessel maintains the body 150 within the vessel 130 under boiling conditions and hence the pumpable fluid entering the inlet compartment 158 forms a slurry in this compartment of particles, moisture, fat, and solvent. As in the embodiments heretofore described, the solvent and moisture form an azeotrope and boil at the lower boiling point of the azeotrope.

The motor 148 rotates the screw conveyor 132 to continuously remove a portion of the slurry from the inlet compartment 158 and isolate this portion of the slurry in the adjacent compartment 154A formed by the continuous spiral blade 156 of the screw conveyor 132. The screw conveyor 132 restricts circulation of the slurry in the compartment 154A from the inlet compartment 158. All of the compartments 154, 158 and 160 are maintained under boiling conditions by the heater 164, and all of the compartments communicate with the upper portion of the vessel 130 and one or more vents 165 which remove the vapors from the upper portion of the vessel 130. As a result, the restriction of circulation between the inlet compartment 158 and the adjacent compartment 154A permits the adjacent compartment 154A to evaporate moisture without receiving additional moisture, and thereby to become dryer than the compartment 158. Due to the continuous rotation of the screw 132, the batch formed by the compartment 154A advanced along the length of the screw and successively accommodates the compartments designated 154B, 154C, 154D, 154E, 154F and 160. The batch of slurry formed by the compartment 154A does not circulate relative to other compartments, and therefore the slurry of this batch is continuously reduced in moisture content. Nevertheless, the boiling point of the compartment containing the batch remains at the boiling point of the azeotrope of solvent and water as long as water remains in the batch. However, by the time the batch is dumped into the outlet compartment 160, the amount of water remaining has been reduced to permit the temperature of the outlet compartment to be approximately at the boiling point of the solvent. Hence, he particles in the batch have been thoroughly and completely dried. It will be recognized that the compartments designated 154A, 154B, 154C, and 154D, 154E and 154F represent batches of slurry in progressively more completed stages of processing.

A runaround conveyor 164 extends into the discharge compartment 160 adjacent to the bottom 134 of the vessel 130 and conveys solid particles to a horizontal conveyor 166, and the runaround conveyor 164 and horizontal conveyor 166 are similar in construction to the conveyors 30 and 42 of the embodiments of FIGS. 1 through 3. Also, the vapors removed from the vapor stacks 165 are condensed, the water separated from the solvent, and the solvent returned to the inlet compartment 158 of the vessel 130 through a pipe 168. In this manner, and with added solvent, the level of the slurry 152 is maintained.

A miscella is removed by means of a pipe 170 located in the wall 142 beneath the level 152 of the slurry but above the runaround conveyor 164. The miscella removed through the pipe 170 contains only dry particles since the boiling temperature of the outlet compartment 160 is approximately at the boiling point of the solvent.

The following examples are intended to illustrate the process of the present invention and are not to be considered as limiting the invention to he exact materials or procedural conditions described.

Example 1.

Beef offal from freshly killed animals was processed through the prebreaker 10, feed screw 12, disintegrator 14, subjected to steam at low pressure in the feed screw, and injected in comminuted form continuously into the primary cooker of the apparatus illustrated in FIGS. 1 through 3. The primary cooker was approximately 65 percent full of boiling ethylene dichloride. The pressure of the vapor within the vessel was substantially atmospheric. The heating coils 26 of the vessel supplied sufficient heat to maintain boiling, and the temperature of the boiling liquid was approximately 71.5° C. The body of solvent was kept boiling vigorously. The vessel contained about 800 gallons of ethylene dichloride and the offal from the slaughter of 70 cattle per hour was introduced into the solvent each hour.

A secondary cooker identical to the primary cooker in construction was used and contained a slurry of 800 gallons transferred from the primary cooker to the secondary cooker. Approximately 90 percent of the solid particles removed from the primary and secondary cookers through the conveyors 30 and 102 was removed from the primary cooker through the conveyor 30, and approximately 10 percent was removed from the secondary conveyor 102. One hundred thirty-five pounds of offal per head of cattle was processed. Twenty-two and five-tenths percent of this offal was recovered in the for of solid particles, 22.5 percent recovered in the form of fat, and 55 percent removed in the for of water.

The temperature of the secondary cooker operating under conditions of atmospheric pressure was approximately 83° C.

The same process may be carried out with the apparatus of FIGS. 5 and 6. Approximately 800 gallons of ethylene dichloride in the vessel 130 can be utilized to process 70 cattle per hour. The screw conveyor divides the vessel into seven approximately equal compartments and an inlet compartment of approximately twice the size of the other compartments.

Example 2.

Hog offal is processed in the same manner as beef offal, either by the apparatus of FIGS. 1 through 3 or FIGS. 5 and 6. There are approximately 35 pounds of offal per hog of which 22.5 percent results in solid granular particles, 22.5 percent results in fat, and 55 percent water.

Example 3.

Whole fish containing 50 to 60 percent moisture are cut up into large chunks. The chunks are treated with steam for 5 seconds and thereafter ground in a prebreaker to particles of less than 0.5 inch diameter. Approximately 9,000 pounds of ground fish per hour was introduced into the apparatus described in example 1. Ground whole fish may also be processed as described in the apparatus of FIGS. 5 and 6 in example 1.

Example 4. Fresh coconut was ground to particles having diameters less than 0.5 inch. Nine thousand pounds of particles was processed per hour with the apparatus of FIG. 1 through 3 or FIGS. 5 and 6 in the manner of example 1.

Example 5. Ground fresh coconut also may be processed with the apparatus of FIG. 4. The same quantity of ground coconut may be processed in the vessel 22 as in the primary cooker 22 of example 4. Approximately 95 percent of the partially dried particles are conveyed through the extractor and defatted to a fat content less than 5 percent. Thereafter, the desolventizers reduce moisture content to less than 5 percent.

It is to be understood that the examples enumerated above can also be carried out with hexane and other solvents enumerated above.

It should be recognized that more heat is required to remove moisture from particles of tissue by forming a slurry of solvent and tissue particles and distilling the azeotrope formed by the water from the tissue and the solvent than is required to remove moisture directly, such as is done in the desolventizers. Nevertheless, it is advantageous to remove moisture by azeotropic distillation to a level which will permit extraction of fat by conventional solvent extraction processes. The embodiments of FIGS. 1 through 3 and FIG. 4 both utilize this method of economizing on heat. Further, the apparatus of FIGS. 5 and 6 may be operated to reduce the moisture content of the particles passing therethrough to a sufficiently low level (less than 20 percent) to permit solvent extraction, and the apparatus used as a substitute for the cooker 22 and conveyor 30 in the apparatus of FIG. 4.

Those skilled in the art will readily devise many other processes and apparatuses for carrying out the processes here disclosed. It is, therefore, intended that the scope of the present invention be not limited by the foregoing disclosure, but rather only by the appended claims.

The invention is claimed as follows:

1. The process of producing fat and nutritious defatted solids from fatty biological substance having a substantial moisture content comprising fragmentizing fatty biological substance into small parts, introducing into an intake zone in a generally continuous manner solvent capable of forming an azeotrope with water and capable of removing fat from the biological substance, introducing small parts of the biological substance in a generally continuous manner into the intake zone to form a mixture with the solvent, heating the mixture substantially continuously in the intake zone to distill off azeotrope formed by the solvent and water from the biological substance, continuously flowing at a controlled limited rate from said intake zone to a dry outlet zone isolated from the intake zone fluent mixture in which is entrained small parts of the biological substance subjected to defatting and drying in said intake zone, continuously heating mixture in said dry outlet zone to further dry the small parts entrained in the fluent mixture admitted into said dry outlet zone from said intake zone, continuously withdrawing at a controlled rate from said dry outlet zone fluent mixture with entrained small parts further dried in said outlet zone, removing the small parts from the fluent mixture withdrawn from the dry outlet zone, and separating fat from the fluent mixture withdrawn from the dry outlet zone.

2. The of claim 1 in which a large portion of the small parts of biological substance subjected to drying and defatting in the intake zone are removed from the fluent mixture in the intake zone for processing independently of such mixture.

3. The process of claim 1 in which a substantial portion of the small parts of biological substance in the outlet zone is removed from the fluent mixture in the outlet zone for further processing independently of such mixture.

4. The process of claim 1 in which the coarser ones of the small parts of biological substance are screened out of the mixture flowed at a controlled limited rate from the intake zone to the outlet zone.

5. The process of claim 4 in which the screen used to screen small parts of biological substance from the mixture flowed from the intake zone to the outlet zone is kept clean by directing solvent onto the screen.

6. The process of claim 5 in which the solvent directed onto the screen is in a vaporous state.

7. The process of claim 7 in which the mixture in the dry outlet zone is heated to a temperature approaching the boiling point of the solvent.

8. The process of claim 8 in which the solvent is ethylene dichloride, in which azeotrope is distilled off from the intake zone at atmospheric pressure at a temperature of approximately 71° C. and in which the mixture in the dry outlet zone is heated to a temperature approaching 83° C.

9. The process of producing fat and nutritious defatted solids from fatty biological substance having a substantial moisture content comprising fragmentizing the biological substance into small parts, introducing into an intake zone in a generally continuous manner a solvent capable of forming an azeotrope with water and capable of removing the fat from the biological substance, introducing small parts of the biological substance in a generally continuous manner into the intake zone to form a mixture with the solvent, heating the mixture substantially continuously in the intake zone to distill off azeotrope formed by the solvent and water from the biological substance, continuously flowing at a controlled limited rate from the intake zone to a dry outlet zone isolated from the intake zone fluent mixture in which is entrained small parts of the biological substance subjected to defatting and drying in the intake zone, continuously heating the mixture in the dry outlet zone to further dry the small parts of biological substance in such mixture to a degree of dryness adequate for filtering of said small parts from the mixture without clogging of the filter, continuously withdrawing at a controlled rate from the dry outlet zone fluent mixture with entrained small parts, filtering the small parts from the fluent mixture withdrawn from the dry outlet zone, and separating fat from the fluent mixture withdrawn from the dry outlet zone.

* * * * *

PO-1050
(5/69)

UNITED STATES PATENT OFFICE
CERTIFICATE OF CORRECTION

Patent No. 3,627,796                    Dated December 14, 1971

Inventor(s)  Ezra Levin

It is certified that error appears in the above-identified patent and that said Letters Patent are hereby corrected as shown below:

Col. 1, line 6, change "related" to --relates--

Col. 1, line 17, change "eater" to --water--

Col. 1, line 21, change "tee" (first occurrence) to --the--

Col. 1, line 58, change "sine" to --since--

Col. 2, line 3, change "he" to --the--

Col. 2, line 36, change "he" (first occurrence) to --the--

Col. 2, line 36, change "pint" to --point--

Col. 2, line 36 change "he" (second occurrence) to --the--

Col. 3, line 40, change "an" to --and--

Col. 3, line 45, after "out" delete "to"

Col. 4, line 50, change "93+" to --93°--

Col. 5, line 7, change "to" to --do--

Col. 5, lines 9 and 10, change "solvent" to --violent--

Col. 5, line 32, change "to" to --for--

Col. 6, line 1, change "filer" to --filter--

Col. 6, line 4, change "75" to --74--

Page two

UNITED STATES PATENT OFFICE
CERTIFICATE OF CORRECTION

Patent No. 3,627,796      Dated December 14, 1971

Inventor(s) Ezra Levin

It is certified that error appears in the above-identified patent and that said Letters Patent are hereby corrected as shown below:

Col. 6, line 22, after "screen 90" insert --also--

Col. 6, line 36, change "perit" to --permit--

Col. 6, line 62, change "cooke" to --cooker--

Col. 7, line 66, change "cooke" to --cooker--

Col. 7, line 72, change "125" to --124--

Col. 8, line 4, after "filter" insert --118--

Col. 9, line 15, change "advanced" to --advances--

Col. 9, line 27, change "he" to --the--

Col. 9, line 52, change "he" to --the--

Col. 10, line 4, change "for" to --form--

Col. 10, line 6, change "for" to --form--

Col. 11, line 16, after "The" insert --process--

Col. 12, line 1, after "claim" delete "7" and insert --6--

Col. 12, line 4, after "claim" delete "8" and insert --7--

Signed and sealed this 21st day of November 1972.

(SEAL)
Attest:

EDWARD M. FLETCHER, JR.
Attesting Officer

ROBERT GOTTSCHALK
Commissioner of Patents